(12) United States Patent
Talli et al.

(10) Patent No.: US 8,509,627 B2
(45) Date of Patent: Aug. 13, 2013

(54) REFLECTIVE OPTICAL TRANSMITTER

(75) Inventors: Giuseppe Talli, Dublin (IE); Paul Townsend, County Cork (IE); Eimear Machale, Dublin (IE)

(73) Assignee: University College Cork - National University of Ireland, Cork, Cork (IE)

( * ) Notice: Subject to any disclaimer, the term of this patent is extended or adjusted under 35 U.S.C. 154(b) by 125 days.

(21) Appl. No.: 12/736,948

(22) PCT Filed: May 27, 2009

(86) PCT No.: PCT/IE2009/000028
§ 371 (c)(1),
(2), (4) Date: Jan. 13, 2011

(87) PCT Pub. No.: WO2009/144691
PCT Pub. Date: Dec. 3, 2009

(65) Prior Publication Data
US 2011/0116808 A1    May 19, 2011

(30) Foreign Application Priority Data
May 27, 2008    (IE) .................................... 2008/0428

(51) Int. Cl.
*H04B 10/04* (2006.01)
(52) U.S. Cl.
USPC ........................................................ 398/201
(58) Field of Classification Search
USPC ......................................... 398/195–198, 201
See application file for complete search history.

(56) References Cited

FOREIGN PATENT DOCUMENTS
EP    2008059281    *    5/2008

OTHER PUBLICATIONS

N. Dupuis et al, "Selective area growth engineering for 80nm spectral range ALGAInAs 10Gbit/s remote amplified modulator," Indium Phosphide and Related Materials, 2008, IPRM 2008, 20$^{th}$ International Conference on, IEEE, May 25, 2008, pp. 1-3.
P. Healey et al., "Spectral slicing WDM-PON using wavelength-seeded reflective SOAs," Electronics Letters, Sep. 13, 2001, vol. 37, No. 19, pp. 1181-1182.

(Continued)

*Primary Examiner* — Leslie Pascal
(74) *Attorney, Agent, or Firm* — Jacobson Holman PLLC

(57) ABSTRACT

A semiconductor optical amplifier (SOA) is used in a double pass configuration with one of the output ports followed by an attenuator, which is followed by a modulator with a reflective facet. The variable loss between the SOA and the modulator is optimised, so that the SOA can be operated in a highly saturated regime without distorting the modulated signal. The SOA is firstly saturated by the input carrier, (21) in FIG. 2, which has a constant power and hence does not introduce patterning of the SOA gain. On the contrary the saturation induced by the carrier creates a clamping effect that prevents patterning for signals with input put power comparable with or less than the input optical carrier power. The optical carrier amplified by the SOA (22) then travels through the attenuator section and it is attenuated (23). The carrier (23) then enters the modulator section where it is modulated with the data signal (24). After being reflected by the high reflectivity facet the modulated signal (25) propagates again through the modulator section. If the modulator section length is short compared to the modulation bit rate, the double passing increases the modulation depth or extinction ratio without introducing distortion. The modulated signal (26) travels a second time through the attenuator and then enters the SOA (27).

11 Claims, 7 Drawing Sheets

(56) References Cited

OTHER PUBLICATIONS

W. Lee et al., "Wavelength filter detuning for improved carrier reuse in loop-back WDM-PON," Electronics Letters, May 11, 2006, vol. 42, No. 10, pp. 596-597.

I. T. Monroy et al, "85km Long Reach PON System Using a Reflective SOA-EA Modulator and Distributed Raman Fiber Amplification," 19th Annual Meeting of the IEEE LEOS 2006, Oct. 2006, pp. 705-706.

M. Zhao et al, "Analysis and Optimization of Intensity Noise Reduction in Spectrum-Sliced WDM Systems Using a Saturated Semiconductor Optical Amplifier," IEEE Phototonics Technology Letters, Mar. 2002, vol. 14, No. 3, pp. 390-392.

A. Garreau et al., "10Gbit/s Amplified Reflective Electroabsorption Modulator for Colorless Access Networks," IPRM Conference Proceedings, 2006, pp. 168-170.

\* cited by examiner

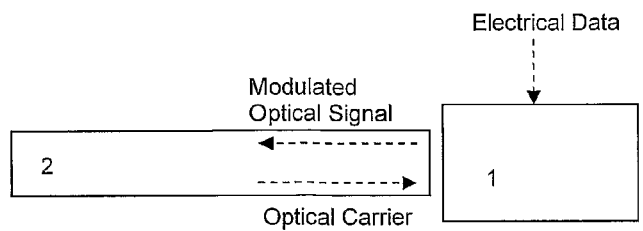
Fig. 1. Reflective Transmitter – PRIOR ART
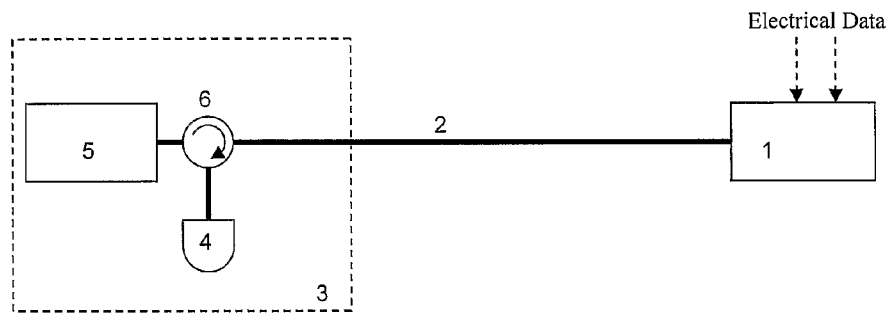
Fig. 2. Optical system with distribution of the optical carrier from head-end – PRIOR ART
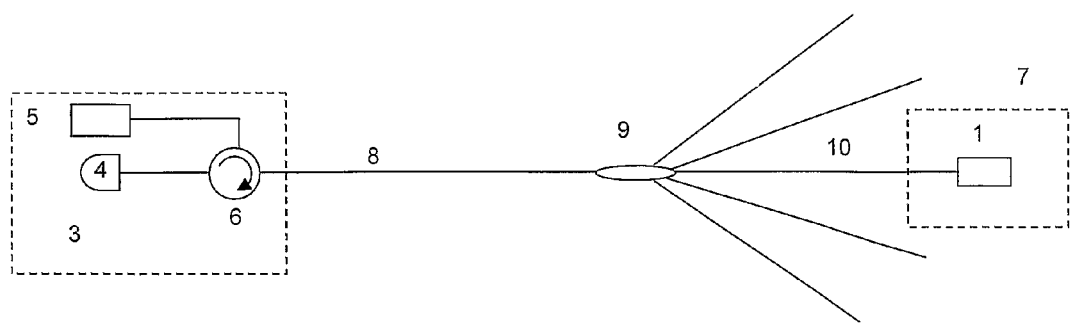
Fig. 3. PON with reflective transmitters (showing upstream only) – PRIOR ART

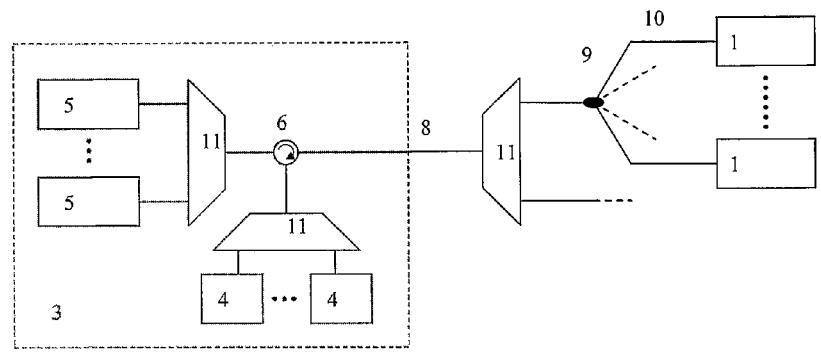
Fig. 4. DWDM-PON with reflective transmitters – PRIOR ART
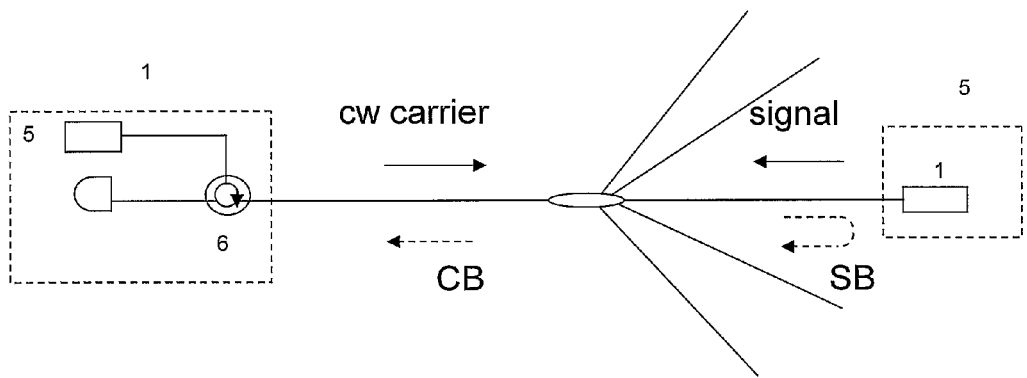
Fig. 5. PON with reflective transmitters (upstream only) showing two main sources of Rayleigh scattering (dashed lines): a) carrier backscattering (CB) and b) signal backscattering (SB). – PRIOR ART

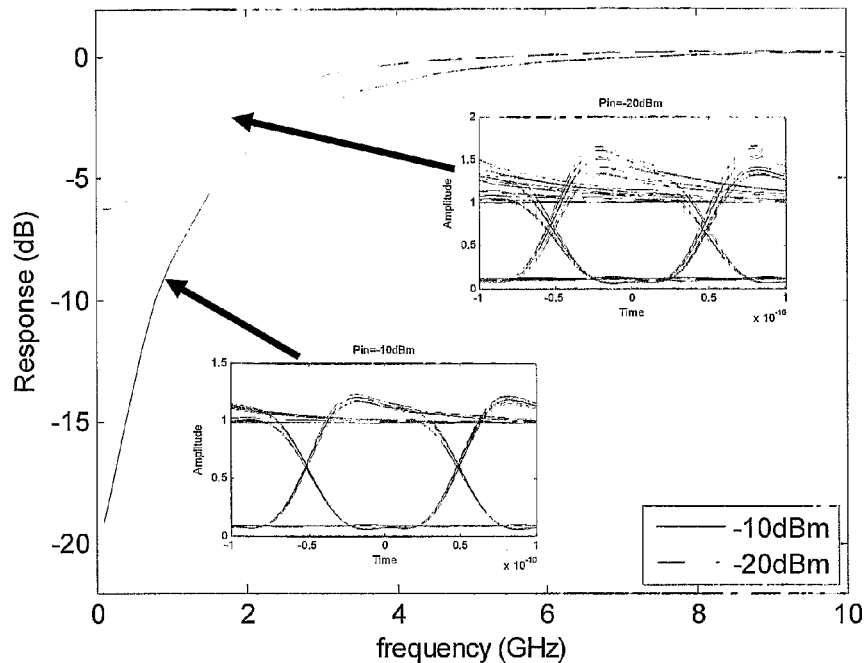
Fig. 9. Small signal frequency response of saturated reflective transmitter with 20dB of overall loss and corresponding eye diagrams at 10Gb/s
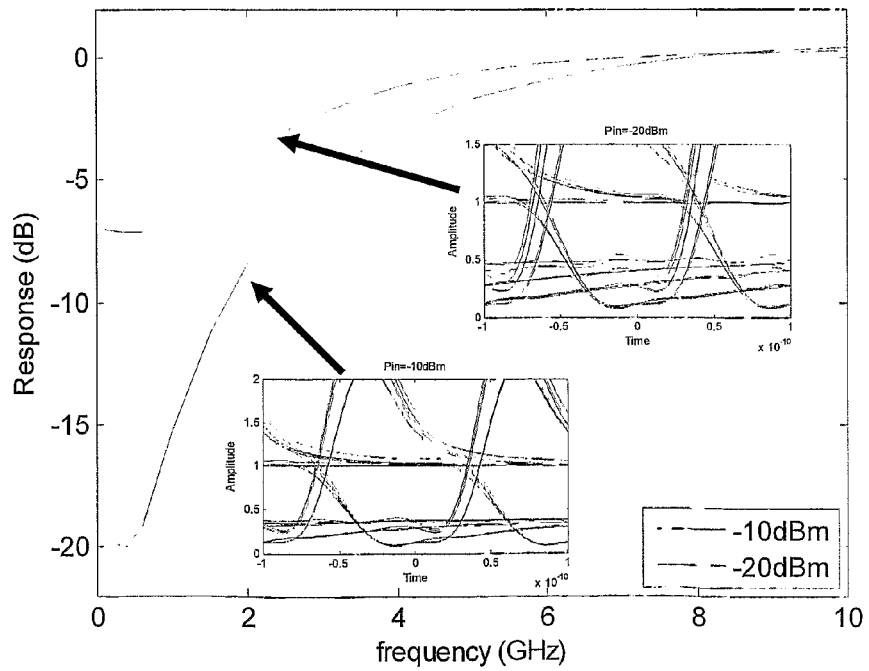
Fig. 10. Small signal frequency response of saturated reflective transmitter with 10dB of overall loss and corresponding eye diagrams at 10Gb/s

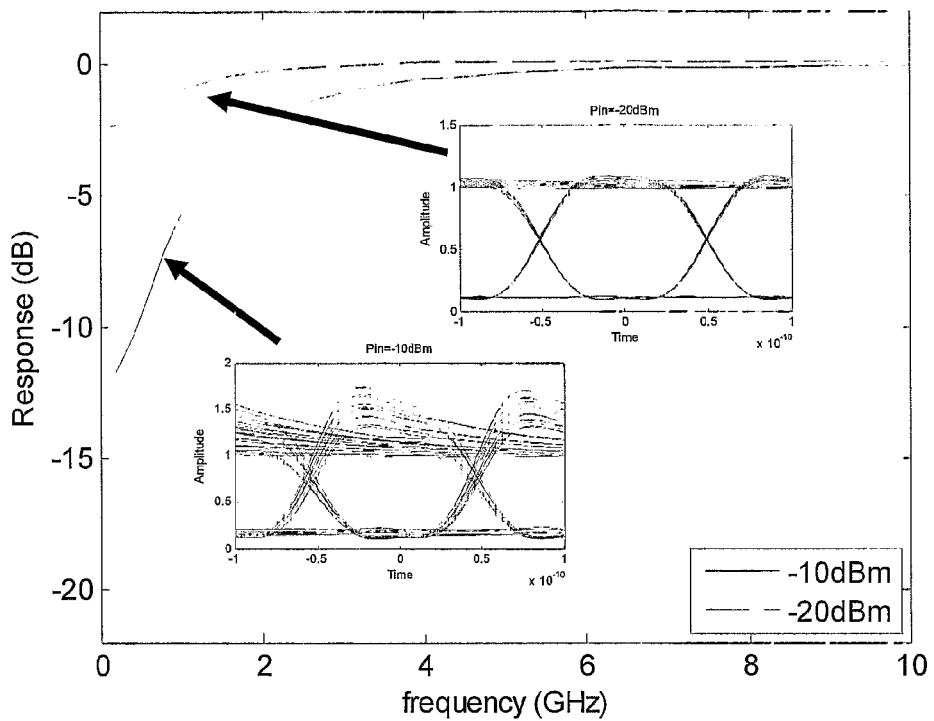
Fig. 11. Small signal frequency response of saturated single pass SOA and corresponding eye diagrams at 10Gb/s
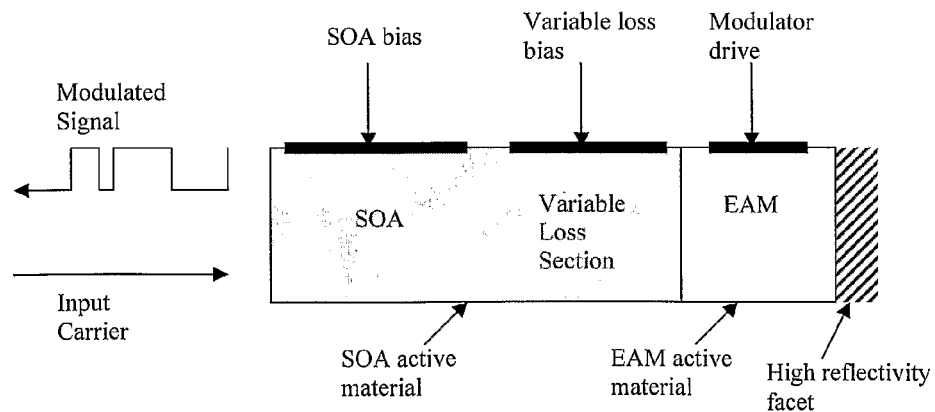
Fig. 12

REFLECTIVE OPTICAL TRANSMITTER

This is a national stage of PCT/IE09/000,028 filed May 27, 2009 and published in English, which has a priority of Irish no. 2008/0428 filed May 27, 2008, hereby incorporated by reference.

INTRODUCTION

1. Field of the Invention

The invention relates to reflective optical transmitters that can be applied in optical communication networks such as passive optical networks (PONs).

2. Prior Art Discussion

FIG. 1 shows the basic operation of a reflective optical transmitter (1). An electrical data signal is modulated onto an optical carrier. The resulting modulated optical signal then exits the reflective transmitter in the opposite direction to the optical carrier. The optical carrier and modulated signal thus counter-propagate in the same transmission medium (2).

An application of reflective transmitters is in optical communication systems, where both the optical carrier light source (i.e. the laser) and the receiver are at the head end and the transmitter station contains simply a reflective transmitter. FIG. 2 shows such a system, where (1) is the reflective transmitter in a remote location and (3) is the head-end of the communication system. The head-end (3) comprises both the receiver (4) and the light source of the optical carrier (5). The optical system also comprises the transmission medium (2), where optical carrier and modulated signal counter-propagate, and a component (6) used to separate the modulated signal at the head-end in order to direct it to the receiver (3). The component (6) could be an optical circulator or a coupler.

FIG. 3 shows a specific example of such a communication system used in a PON. A conventional PON consists of a network head end station (3), which is linked by means of a feeder fibre (8) to a passive optical splitter (9), the outputs of which are connected by means of drop fibres (10) to a plurality of end user stations (7). In a PON, where reflective optical transmitters (1) are used in the end user stations (7), the light source (5) supplies a continuous wave (CW) optical carrier to all of the end users, which is modulated by means of the reflective modulators to generate the upstream data signals (note only the upstream channel is shown for clarity). This type of architecture is usually referred to as carrier distributed PON. The transmitters may optionally contain an optical amplifier, or amplifiers, in order to boost the user data signals to overcome the effects of loss in the network (arising, for example, from splitting loss).

Monolithic or hybrid integration of these components is preferable in order to reduce the overall cost of the reflective transmitter. As an example, monolithic integration of semiconductor based electro-absorption modulator (EAM) and semiconductor optical amplifiers (SOAs) has been demonstrated for transmission mode transmitters. Proof of concept devices have been also reported in the literature employing a reflective structure [2, 3]. One of the objectives of these integrated devices is to reduce as much as possible the loss at the interfaces between the different components in order to improve the performance by increasing the overall device gain or by allowing operation at a reduced SOA bias current. For example, reference [2] describes a transmitter having no net gain. Reference [3], published two years later, describes a remote amplified modulator in which approaches such as selective mask layout are used to reduce loss and improve net gain (in this case achieving 10 dB). This is representative of the general trend which as been to minimise loses in order to increase net gain in the transmitter.

In applications where the end users need to have precisely matched wavelengths this scheme has the potential advantage that only one wavelength specified source (12) is required for the network as a whole rather than one per user. This can have major cost advantages as such sources are typically expensive. An important example of a PON using reflective transmitters is a Dense Wavelength Division Multiplexed-Passive Optical Network (DWDM-PON). The advantage of this scheme is that the cost of wavelength referencing and control is shared between many users rather than being borne by individual users and no multi-wavelength source inventory is required for the end users. FIG. 4 shows such a DWDM-PON with a number of light sources (5) working at different optical wavelengths and a number of receivers (4). The optical sources are combined using a wavelength multiplexer.

A system able to support a large number of users is advantageous in this type of architecture since the cost of the network infrastructure is shared and hence the cost per customer can be reduced. A simple way to increase the number of users is to increase the ratio of the power splitter. Two issues are directly connected with the split ratio, the mean increase in power loss in the network and the increase in the possible variation in loss between users due to non-uniformity of the power splitters.

The mean increase in loss requires that a higher power needs to be launched by the reflective modulator for the receiver performance to be maintained. If an SOA is used in the reflective transmitter the maximum output power must be well below the gain saturation value in order to avoid distortion of the signal due to gain recovery-induced patterning. High reflective transmitter output powers can be achieved, but the SOA at the output must necessarily be operated in the linear regime.

The variation in loss between users has a particular effect in a carrier-distributed scheme since the power of the optical carrier will vary depending on the splitter port to which the reflective transmitter is connected. If the transmitter is operated in the linear regime, hence with a constant gain as a function of the carrier power, the output power will vary by the same amount as the carrier. Since the transmitter modulator output signal will be transmitted back to head end following the same path, the power at the receiver will have a variation that is twice (in logarithmic units) the variation in path loss. The variation in the power received at the head end between the various users is usually referred to as dynamic range.

Another issue introduced by the use of reflective transmitters is that there is bidirectional or counter-propagating propagation of light with the same centre wavelength in the transmission medium (the carrier and the upstream signals). Hence the systems using silica fibre as transmission medium are susceptible to interferometric beat noise generated by Rayleigh back-scattering (RB) and back-reflections from components in the fibre path, which can lead to impairments if suitable mitigation schemes are not employed. This can lead to Rayleigh scattering-induced noise that may prevent operation of the network.

In the case of bidirectional passive optical networks using reflective transmitters such as those shown in FIGS. 3, 4 and 5 there are two distinct sources of Rayleigh light that need to be considered: firstly Rayleigh generated by the unmodulated optical carrier travelling in the downstream direction and secondly Rayleigh generated by the modulated signal as it travels upstream. The latter passes back through the transmitter where it is reflected and amplified (in the case where the transmitter has net gain) so that it is now co-propagating with the signal in the upstream direction. The two processes are shown schematically in FIG. 5. The relative importance of the two processes regarding the noise generation depends on the network architecture, but in general both need to be considered.

One mitigation scheme that has been shown to be effective against the Rayleigh noise generated by the signal is the use of a saturated SOA to amplify the input carrier. The saturated regime has the beneficial effect of reducing the noise on the input light, both interferometric and on the amplitude. This effect, extensively studied in the literature for a single pass SOA, is usually called noise squeezing. However, the use of a single pass SOA for noise squeezing in a reflective transmitter is not practical, since a complex design, involving a circulator and, possibly, an extra SOA to increase the output signal power is required. This is because the saturated single pass SOA in this scheme must precede the data modulator in order to prevent gain recovery-induced patterning.

The invention is directed towards providing an optical transmitter which overcomes at least some of the above problems.

REFERENCES

[1] I. T. Monroy et al. "85 km Long Reach PON System Using a Reflective SOA-EA Modulator and Distributed Raman Fiber Amplification," 19th Annual Meeting of the IEEE LEOS 2006, pp. 705-706, October 2006
[2] A. Garreau et al. "10 Gbit/s Amplified Reflective Electro-absorption Modulator for Colourless Access Networks," IPRM Conference Proceedings, 2006, pp. 168-170, 7-11 May 2006
[3] N. Dupuis et al "Selective Area Growth Engineering for 80 nm Spectral Range AlGaInAs 10 Gbits Remote Amplified Modulator" IPRM Conference Proceedings, May 25 to 29, 2009.
[4] M. Zhao et al, "Analysis and Optimization of Intensity Noise Reduction in Spectrum-Sliced WDM Systems Using a Saturated Semiconductor Optical Amplifier, IEEE Photonics Technology Letters, Vol. 14 No. 3, March 2002 pp 390-392.

SUMMARY OF THE INVENTION

According to the invention, there is provided an optical transmitter of the reflective modulation type, the transmitter having a means of generating reflection, an optical modulator for modulating an optical carrier with a data stream, and an optical amplifier for amplifying the optical carrier and the modulated signal, wherein the transmitter further comprises an attenuator for controlled attenuation of a signal to control intensity of the modulated signal entering the amplifier.

The use of an attenuator in this context is in the inventors' view counter-intuitive. In this art the view has been that further attempts should be made to reduce device loss, and not deliberately increase loss by introducing an attenuator. The reason for this is that as the gain of the modulator is increased less input carrier power is required in order to attain a given target level of modulated output power. The prior view of the approach of the invention would have been that one is "wasting" some of the amplifier gain by adding extra loss, thereby complicating the design and adding unnecessary additional cost to the device, and not achieving any benefit. However, the inventors have realised that by taking the counter-intuitive approach of deliberately adding loss benefits are actually achieved in terms of for example reduced patterning, noise reduction, and increased dynamic range. This is achieved because the invention allows the amplifier to be operated in a highly saturated regime without distorting the modulated signal.

In one embodiment, the attenuator is in a path from the amplifier, through the modulator, and back to the amplifier In one embodiment, the attenuator is bi-directional, attenuating both the amplified carrier and the modulated signals.

In one embodiment, the modulator has one facet with high reflectivity.

In another embodiment, the modulator is preceded by the optical amplifier.

In one embodiment, the optical amplifier is a semiconductor optical amplifier.

Preferably, the transmitter further comprises a controller for dynamically controlling the attenuator.

In one embodiment, the controller operates in response to power output of the transmitter, as sensed for example by a photodiode.

In one embodiment, the power is sensed at the head end.

In another embodiment, the optical amplifier is operated in a highly saturated regime with minimum distortion of the modulated signal.

In one embodiment, the attenuation is controlled so that in combination with saturated operation of the amplifier the dynamic range of the output signals is less than that of the input optical carrier.

In one embodiment, the attenuation control is such that the optical amplifier, operated in a highly saturated regime, suppresses intensity and interferometric noise present in the optical carrier.

Preferably, the attenuator is adapted to operate such that the total double pass loss of the attenuator and of the modulator sections is comparable to or higher than the single pass optical gain of the optical amplifier.

DETAILED DESCRIPTION OF THE INVENTION

Brief Description of the Drawings

The invention will be more clearly understood from the following description of some embodiments thereof given by way of example only with reference to the accompanying drawings, in which:

FIGS. 1 to 5 are diagrams concerning the prior art, as set out above;

FIGS. 9 to 11 are plots showing simulation results demonstrating advantages of the invention concerning the reduction of intensity and interferometric noise and the reduction of the distortion of the output signal; and FIGS. 12 to 15 are diagrams showing further embodiments.

DESCRIPTION OF THE EMBODIMENTS

Figure 6:
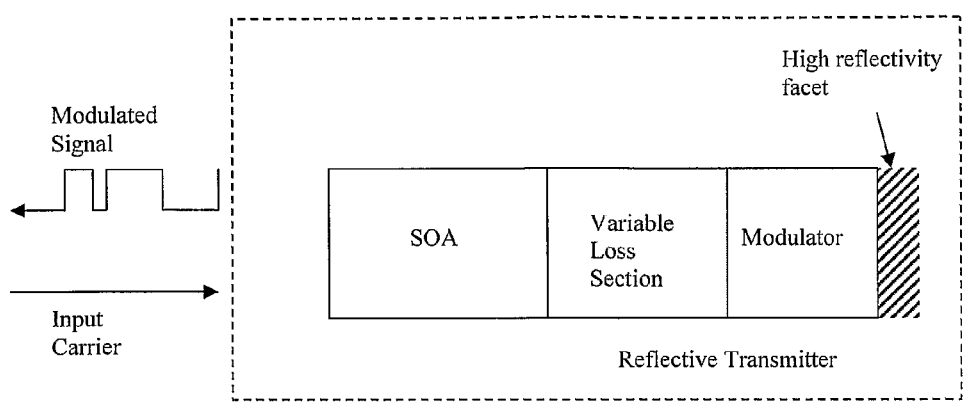
FIG. 6 is a diagram showing schematically the structure and internal components of an optical transmitter of the invention.

Referring to FIG. 6 a reflective transmitter comprises an SOA, a variable loss section ("attenuator"), a modulator, and a high reflectivity facet ("mirror"). The attenuator introduces a controlled level of attenuation so that the modulated signal passing back through the SOA arrives with a power approximately equal to the level of the incoming carrier signal. This arises because the attenuation matches approximately the gain of the SOA. While it is known that the interfaces between an SOA and a modulator will provide a degree of unintended attenuation, in the invention the degree of attenuation is either set at a controlled level to achieve the desired benefit or it is dynamically controlled in response to various parameters.

The input carrier is amplified by the SOA sufficiently to drive the SOA into saturation, the SOA output is attenuated, is modulated, is attenuated, and is returned to the SOA with a power level similar to that of the input carrier.

The major benefits of the attenuator are that it allows the SOA to operate in a highly saturated regime without the SOA introducing distortion. Also, it reduces or eliminates the need for active output power control. Further, it reduces intensity and interferometric noise present in the optical carrier. The inventors have realised that these benefits can be achieved if they take the non-intuitive approach of deliberately introducing loss into the optical transmitter at a specific point between the SOA and the mirror.

Figure 7:
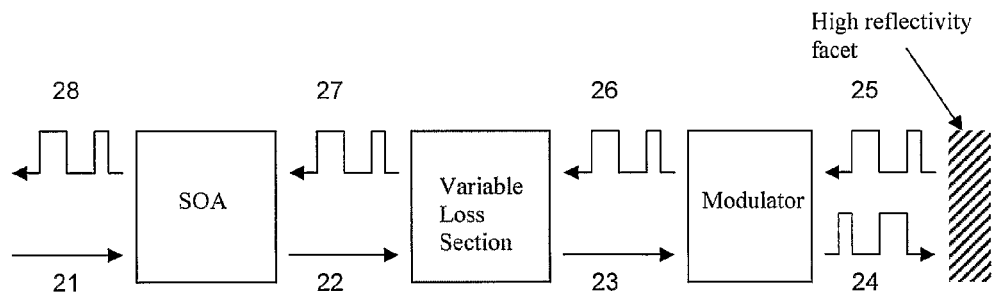
FIG. 7 is a diagram showing the carrier and modulated signal propagating through the various sections of the transmitter.

In more detail, the semiconductor optical amplifier (SOA) is used in a double pass configuration with one of the output ports followed by the attenuator, which is followed by a modulator with a reflective facet (FIG. 6). The variable loss between the SOA and the modulator is optimised, so that the SOA can be operated in a highly saturated regime without distorting the modulated signal. In contrast, in a single pass SOA, the gain-saturation would induce patterning distortion. In the invention the SOA is firstly saturated by the input carrier, (21) in FIG. 7, which has a constant power and hence does not introduce patterning of the SOA gain. On the contrary, the saturation induced by the carrier creates a clamping effect that prevents patterning for signals with input power comparable with or less than the input optical carrier power. The optical carrier amplified by the SOA (22) then travels through the attenuator section and it is attenuated (23). The carrier (23) then enters the modulator section where it is modulated with the data signal (24). After being reflected by the high reflectivity facet the modulated signal (25) propagates again through the modulator section. If the modulator section length is short compared to the modulation bit rate, the double passing increases the modulation depth or extinction ratio without introducing distortion. The modulated signal (26) travels a second time through the attenuator and the resultant attenuated modulated signal (27) enters the SOA.

If the modulated signal (27) power entering the SOA is comparable to or lower than the input optical carrier (21) the signal will not introduce distortion even though the SOA is operating in saturation. This can be achieved if the total loss, introduced by double-passing the attenuator and the EAM sections, is comparable to or higher than the optical gain of the SOA. If the total loss is appreciably lower than the gain, the modulated signal at the input of the SOA will introduce patterning that will create distortion in output signal. The fact that a high loss is beneficial is counter-intuitive and in fact the development of similar structures known from the literature aim to obtain the lowest possible loss.

However, a simple high loss with an uncontrolled value is not sufficient to guarantee the performance of the reflective transmitter. There is in fact also an upper limit on the tolerable loss that is imposed by the noise introduced by the SOA. If the loss is too high the quality of the output signal will be reduced by the noise introduced by the amplified spontaneous emission.

This requires a precise control of the optical loss, which, in the disclosed structure, is obtained using a variable attenuator. Manufacturing imperfection will inevitably lead to variations between various devices produced in the coupling losses between the three sections and in the modulator insertion loss. Hence trying to obtain the precise control of the overall loss by designing a fixed loss might lead to a poor manufacturing yield. On the other hand, the variable loss section allows the loss after the SOA to be precisely controlled to the optimum value independent of the manufacturing variation, hence increasing the manufacturing yield of these devices.

Figure 8:
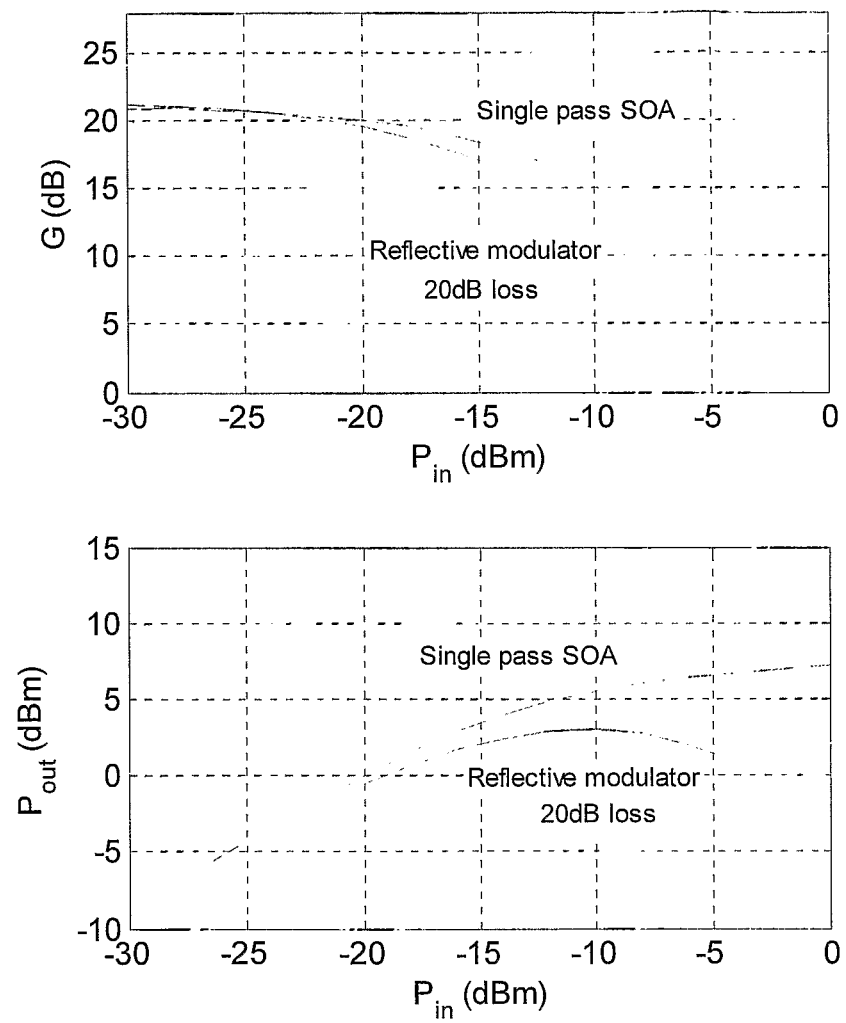
FIG. 8 is a plot showing simulation results demonstrating advantage of the invention concerning the reduction of the output signal dynamic range compared to the input carrier dynamic range.

A secondary effect of the structure is the clamping of the output power for a range of input powers. This is advantageous in PONs since it allows the improvement of the dynamic range introduced by the variation in the loss of the carrier path between users of a PON. This effect is shown in FIG. 8 for a reflective transmitter with SOA single pass gain of 21.5 dB and a 3 dB saturation power of ~8 dBm and double pass loss of modulator and variable loss of 20 dB. FIG. 8 shows the reflective transmitter gain and output power as a function of the input carrier power. We can clearly see the output power reaching a maximum value of ~3 dBm for input carrier power of −10 dBm. We can also notice that the output power is within 3 dB of maximum value for carrier powers between around −19 dBm and −3 dBm. This means that the structure can operate with 16 dB variation of the input carrier power generating only 3 dB of dynamic range on the output signal. For comparison, FIG. 8 also shows the gain and output power of a single pass SOA with the same characteristics as a function of the input power. In this case the output power continues to increase as function of the input power although the device is in saturation.

The variable loss section can also be used to adjust the value of the maximum output power and the input power at which this is achieved. Hence the variable loss section allows the control of the output power independently of the input power.

It is important to note that the flat region of output powers corresponds to the output powers at which the reflective transmitter disclosed here, although being in saturation, does not introduce distortion.

The highly saturated regime, in which the reflective transmitter exhibits the described features, has also the beneficial effect of reducing interferometric and amplitude noise on the input light. This effect, extensively studied in the literature (for example reference [4]) for single pass SOAs, is usually called noise squeezing. The noise squeezing effect can be used to reduce the interferometric noise generated by the RB induced by the signal in carrier distributed DWDM PONs. However, the use of a single pass SOA for noise squeezing in a reflective transmitter is not practical, since a complex design, involving a circulator and, possibly, an extra SOA to increase the output signal power is required. This is because the saturated single pass SOA in this scheme must precede the data modulator in order to prevent gain recovery-induced patterning.

In contrast, the reflective transmitter structure disclosed here is able to reduce the interferometric noise in carrier distributed DWDM PONs with minimal distortion. FIG. 9 shows the small signal frequency response of the reflective transmitter when saturated by two different levels of input carrier power, −20 and −10 dBm. The attenuation introduced at low frequencies is the cause of the noise mitigation and hence a higher attenuation means higher noise suppression. The attenuation introduced at low frequencies for −10 dBm is higher than that for −20 dBm, due to the higher saturation of the SOA. However, as can be seen in the insets of FIG. 9, the saturation of the SOA introduces only a relatively small distortion in the shape of the eye diagram of the modulated output signal.

For comparison, FIG. 10 shows the corresponding frequency response that would be obtained with a double pass loss of 10 dB due to the attenuator and the modulator. The attenuation at low frequency, and hence the noise suppression, is slightly higher for both input powers since the SOA is more saturated. However, the eye diagrams presented in the inset of FIG. 10 show a higher level of distortion compared to the case where the loss is 20 dB. When the loss is reduced the modulated signal at the input of the SOA, (27) in FIG. 7, saturates the SOA, hence causing patterning induced distortion. The saturation causing the distortion is present even for low input powers due to the amplified spontaneous emission (ASE) that is modulated and reflected back into the SOA. This example illustrates that there is also a lower limit on the loss required within the reflective transmitter. If the loss is too low the output signal will be distorted by the SOA patterning.

FIG. 11 shows the corresponding frequency response that would be obtained by a single pass SOA with the same characteristics. The attenuation at low frequency, and hence the noise suppression, is smaller for both input powers due to the fact that the saturated SOA is passed only once. In particular the noise suppression introduced by −20 dBm input power is negligible, while the one for −10 dBm is nearly half that obtained by the reflective transmitter. Hence, to obtain the same noise suppression a higher level of saturation is necessary, which requires a higher input power. Moreover, the eye diagrams presented in the inset of FIG. 10 already show a higher distortion for −10 dBm compared to the reflective transmitter. For higher input powers the distortion would rapidly increase.

The amount of noise suppression obtainable is also dependent on the overall loss after the SOA section. A careful optimization is necessary in order to obtain the highest noise suppression for the input carrier power of interest. Hence the presence of the variable loss section is also beneficial in order to optimise the noise suppression performance of the reflective transmitter.

The exact value of the loss required to obtain the best performance will depend on the characteristics of the SOA and the modulator used and the required input/output power operating conditions. A trade off between the various beneficial effects described might be required, which can be achieved at design level once the characteristics of the various components and the operating conditions are known.

Using the variable loss section the reflective transmitter can also be optimised after being deployed in the network. The power and quality of the signal received at the head end could be used to feed back control information to the reflective transmitter in order to optimise, for example, the value of the variable loss. In another embodiment a monitor photodiode inside the reflective transmitter could be used to monitor the output signal power and adjust the variable loss section in order to obtain a predetermined output power level.

Figure 13:
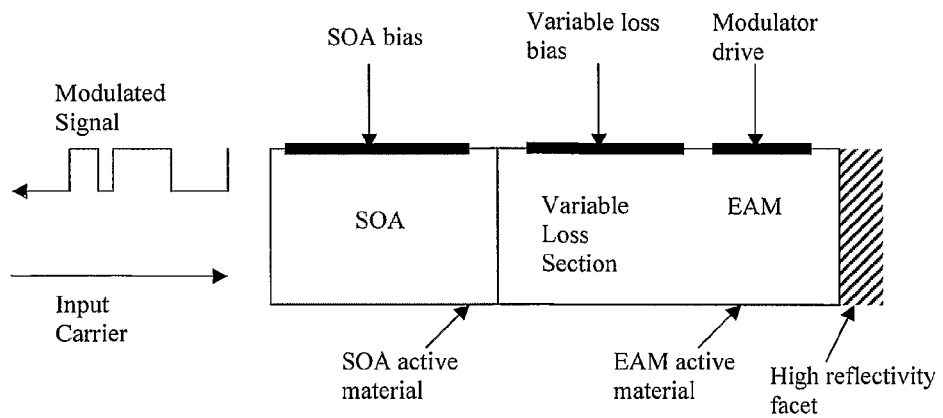

FIGS. 12 and 13 show possible implementations of the reflective transmitter disclosed here using a monolithically integrated SOA and electro-absorption modulator (EAM). In FIG. 12 the variable loss section is obtained by splitting the bias contact of the SOA section and driving the two contacts with different bias currents in order to obtain the variable loss section. Similarly in FIG. 13 the drive contact of the EAM section is split in order to control separately the attenuation introduced by the high speed modulator section and the variable loss section.

Figure 14:
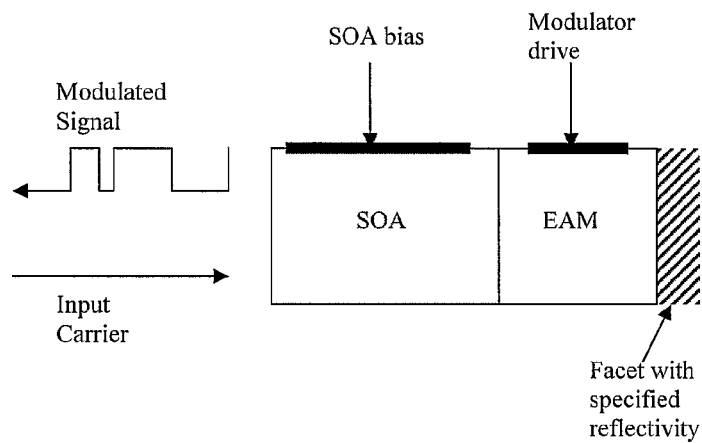

FIG. 14 shows a simpler implementation where the function of the loss section is performed by the reflective facet. A non-perfectly reflective facet could introduce the required loss and the value could be controlled during the design by the use of specifically-tailored, reflective dielectric coatings. Using more complex reflector designs, such as for example Bragg reflectors, the value of the reflectivity could be varied and controlled in the same way as envisioned when using a variable loss section.

Figure 15:
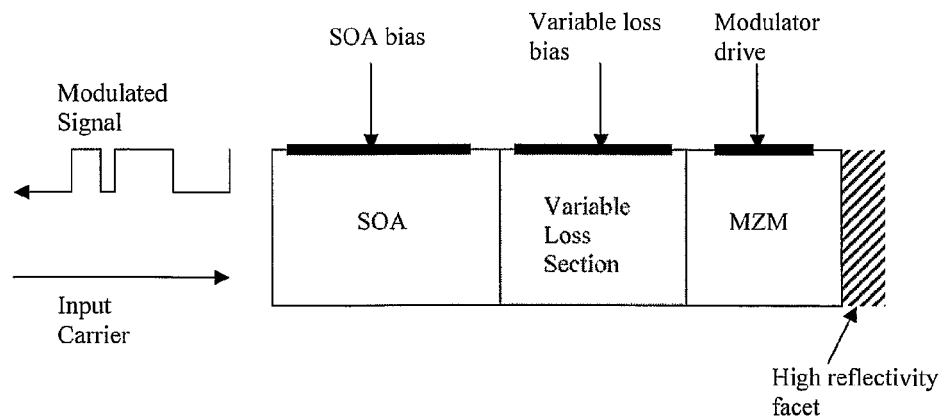

FIG. 15 presents another possible implementation where the modulator section is a semiconductor based optical Mach-Zehnder modulator (MZM), which is monolithically integrated with the SOA section and the variable loss section. Also in this implementation the variable loss could be obtained via a split contact on the SOA section or with a separate EAM section. The integration of a MZM allows more complex and efficient modulation formats to be implemented with, for example, improved Rayleigh noise suppression.

The invention is not limited to the embodiments described, but may be varied in construction and detail. For example, the attenuator may be located between the modulator and the mirror or the various components could be fabricated using different technologies and hybridly integrated.

The invention claimed is:

1. An optical transmitter of the reflective modulation type, the transmitter comprising:
   a mirror,
   an optical modulator for modulating an optical carrier with a data stream to provide a reflected modulated signal,
   an optical amplifier for amplifying a received optical carrier and for amplifying the reflected modulated signal,
   an attenuator for controlling intensity of the modulated signal entering the amplifier, and
   wherein the attenuator is operable to attenuate the modulated signal to allow the optical amplifier to be driven into saturation by the carrier so that:
   the amplifier suppresses noise in the carrier, and
   the amplifier introduces only minimal distortion into the modulated signal as the modulated signal passes through the amplifier.

2. The optical transmitter as claimed in claim 1, wherein the attenuator is in a path from the amplifier, through the modulator, and back to the amplifier.

3. The optical transmitter as claimed in claim 1, wherein the attenuator is in a path from the amplifier, through the modulator, and back to the amplifier; and wherein the attenuator is bi-directional, attenuating both the amplified carrier and the modulated signals.

4. The optical transmitter as claimed in claim 1, wherein the mirror is a facet of the modulator.

5. The optical transmitter as claimed in claim 1, wherein the modulator is preceded by the optical amplifier.

6. The optical transmitter as claimed in claim 1, wherein the optical amplifier is a semiconductor optical amplifier.

7. The optical transmitter as claimed in claim 1, further comprising a controller for dynamically controlling the attenuator.

8. The optical transmitter as claimed in claim 1, further comprising a controller for dynamically controlling the attenuator; and wherein the controller is operable in response to power output of the transmitter.

9. The optical transmitter as claimed in claim 1, further comprising a controller for dynamically controlling the attenuator; and wherein the controller is operable in response to power output of the transmitter, as sensed remotely at a head end.

10. The optical transmitter as claimed in claim 1, further comprising a controller for dynamically controlling the attenuator; and wherein the controller is adapted to control the attenuation so that in combination with the saturated operation of the amplifier the dynamic range of the output signals is less than that of the input optical carrier.

11. The optical transmitter as claimed in claim 1, wherein the attenuator is adapted to operate such that total double pass loss of the attenuator and of the modulator is comparable to or higher than the single pass optical gain of the optical amplifier.

\* \* \* \* \*

UNITED STATES PATENT AND TRADEMARK OFFICE
CERTIFICATE OF CORRECTION

PATENT NO.      : 8,509,627 B2  
APPLICATION NO. : 12/736948  
DATED           : August 13, 2013  
INVENTOR(S)     : Talli et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 169 days.

Signed and Sealed this

Fifteenth Day of September, 2015

Michelle K. Lee
*Director of the United States Patent and Trademark Office*